United States Patent [19]

Chu

[11] Patent Number: 5,184,002
[45] Date of Patent: Feb. 2, 1993

[54] OPTICAL SCANNER

[75] Inventor: Ching Chu, Mississauga, Canada

[73] Assignee: Optical Recording Corporation, Toronto, Canada

[21] Appl. No.: 735,669

[22] Filed: Jul. 26, 1991

Related U.S. Application Data

[63] Continuation of Ser. No. 440,695, Nov. 24, 1989, abandoned.

[51] Int. Cl.[5] .......................... G06K 7/10; G06K 7/14; G06K 7/00; G11B 7/00
[52] U.S. Cl. .................................. 235/454; 235/439; 369/44.15; 369/44.16
[58] Field of Search ...................... 235/439; 369/44.15, 369/44.16

[56] References Cited

U.S. PATENT DOCUMENTS

| | | |
|---|---|---|
| 3,273,446 | 9/1966 | Goetz et al. |
| 3,549,826 | 12/1970 | Browning. |
| 3,795,902 | 3/1974 | Russell. |
| 3,898,629 | 8/1975 | Westerberg. |
| 4,102,569 | 7/1978 | Schwartz. |
| 4,163,600 | 8/1979 | Russell. |
| 4,416,001 | 11/1983 | Ackerman et al. |
| 4,428,643 | 1/1984 | Kay. |
| 4,525,828 | 6/1985 | Higashima et al. ............ 369/97 |
| 4,532,616 | 7/1985 | Jewer. |
| 4,538,882 | 9/1985 | Tanaka et al. ............ 369/44.16 |
| 4,557,564 | 12/1985 | van Rosmalen ............ 369/44.15 |
| 4,571,713 | 2/1986 | Ackerman et al. |
| 4,583,816 | 4/1986 | Kramer. |
| 4,616,355 | 10/1986 | Kasahara ............ 369/44.16 |
| 4,669,070 | 5/1987 | Bell ............ 369/44.18 |
| 4,688,201 | 8/1987 | Towner et al. ............ 369/112 |
| 4,692,913 | 9/1987 | Ackerman et al. |
| 4,701,674 | 10/1987 | Oono et al. ............ 369/119 |
| 4,730,297 | 3/1988 | Ishibashi et al. ............ 369/112 |
| 4,773,062 | 9/1988 | Wada et al. ............ 369/44.16 |
| 4,831,244 | 5/1989 | Slafer et al. |

FOREIGN PATENT DOCUMENTS

| | | |
|---|---|---|
| 2022265 | 5/1970 | Fed. Rep. of Germany. |
| 2075843 | 12/1969 | France. |

OTHER PUBLICATIONS

IBM Technical Bulletin, vol. 6, No. 8, Jan. 1964.
Ishibashi, "Optical Storage Technology and Applications", SPIE, vol. 899 (1988).

Primary Examiner—Eugene R. LaRoche
Assistant Examiner—Christopher R. Glembocki
Attorney, Agent, or Firm—Keck, Mahin & Cate

[57] ABSTRACT

An optical scanner has focusing elements rotatable about a fixed axis. The elements are each mounted on a flexible radially extending suspension arm. A magnet is carried by each arm and passes a coil extending along the path of the elements. Current to the coil is controlled to induce movement of the arm in a direction parallel to the axis of rotation and effect focusing of the elements.

31 Claims, 7 Drawing Sheets

OPTICAL SCANNER

This application is a continuation of application Ser. No. 07/440,695, filed Nov. 24, 1989, now abandoned.

The present invention relates to optical scanners.

The optical recording and retrieval of data offers significant advantages in terms of data density and permanency. A common format of optical storage utilizes a rotating record that is read by a stationary head movable with respect to the record in a transverse direction to the tracks. An alternative format that is more convenient in certain applications is a record in the form of a card with the data recorded in tracks on the card. This format is most convenient where the card is to be carried by the user in a pocket or purse, for example when used as a bank transaction card or as a personal medical history.

To record or retrieve data from a stationary record, a scanner must operate with two-dimensional motion relative to the card and this can be achieved by rotating the card as in U.S. Pat. No. 4,831,244 or by causing an optical element to traverse the card while the card and scanner move in a linear motion relative to each other. The most convenient form of scanner to achieve high data rates is a rotating scanner in which the optical element is rotated about an axis normal to the surface of the record and traces an arcuate path across the record. Examples of such scanners are shown in U.S. Pat. Nos. 3,795,902 and 4,163,600, both to Russell.

Because of the inevitable irregularities and flexure of the record and to accomodate the tolerances of record dimensions and externally induced vibrations, it is necessary to provide a focussing system for such a scanner. In systems utilizing a rotating record, focussing is achieved by flexibly mounting the optical element on a tracking arm and using a coil to move it toward and away from the record. In a system where the optical element rotates, however, such arrangement is not desirable. Rotating scanners usually have multiple optical elements to achieve high data rates and a focussing coil would be required for each element. As the elements are rotating, it is necessary to provide control and feedback signals from the stationary control circuitry to the rotating coils which leads to further complications. Moreover, the centrifugal force imposed on the element due to its rotation significantly increases the power requirements for the actuator and may introduce cross-talk errors between the focusing and tracking actuators.

It is possible to locate a focussing element in the optical path prior to the distribution of the optical beam to each of the rotating elements but this may also result in the beam being displaced from the optical axis of the elements which is generally undesirable.

Accordingly, previous attempts at the focussing control of the optical element have been less than optimum.

It is an object of the present invention to obviate or mitigate the above disadvantages.

According to the present invention, there is provided an optical scanner having a housing, a scanner assembly rotatable in said housing and having a mounting member carrying an optical element at a location spaced from the rotational axis of said assembly to cause said element to move in an arcuate path and scan a record, said mounting member being flexible to permit movement of said optical element in a direction parallel to the axis of rotation and drive means connected to said housing and operable upon said mounting member to control flexure thereof over at least a portion of the path of said element.

Preferably multiple mounting members are utilized, each having an optical element associated therewith. The drive means is preferably a coil extending along the portion of the path over which the element scans the card. The position of the element may then be adjusted by varying the field induced by the coil.

In the preferred embodiment, the optical elements may be rigidly mounted on the mounting members and all control signals are provided to the stationary coil.

Embodiments of the present invention will now be described by way of example only with reference to the accompanying drawings in which FIG. 1 is a section through an optical scanner;

Figure 1:
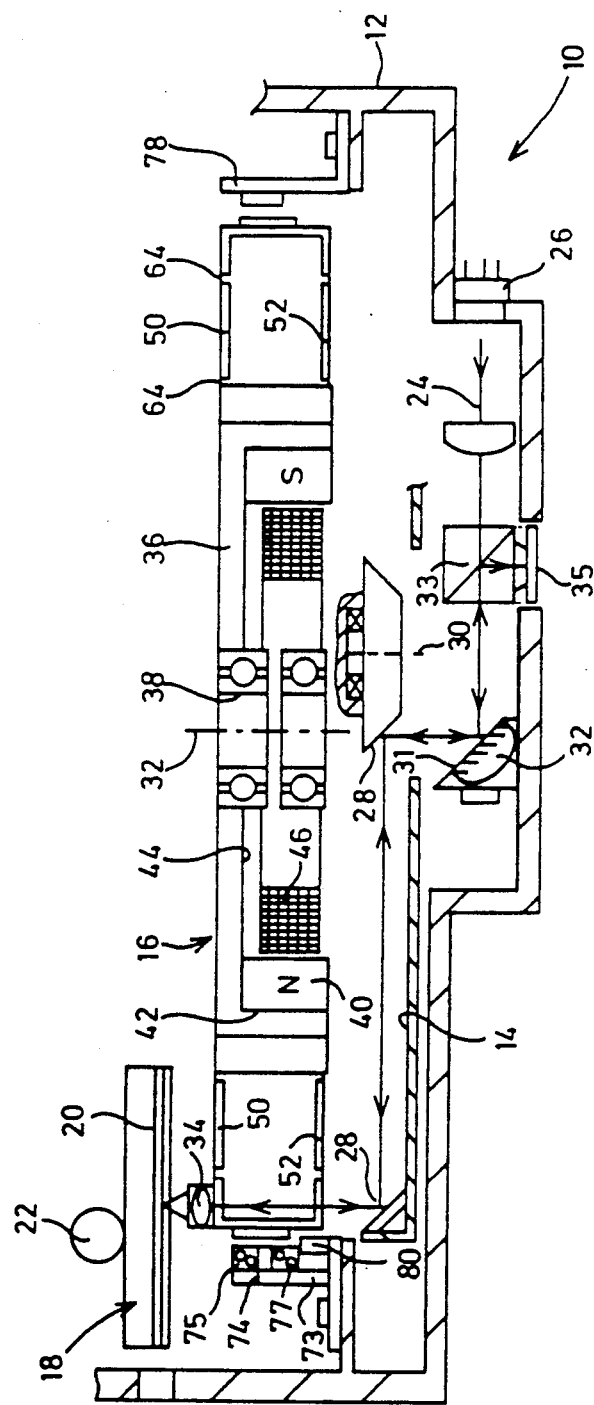
Figure 2:
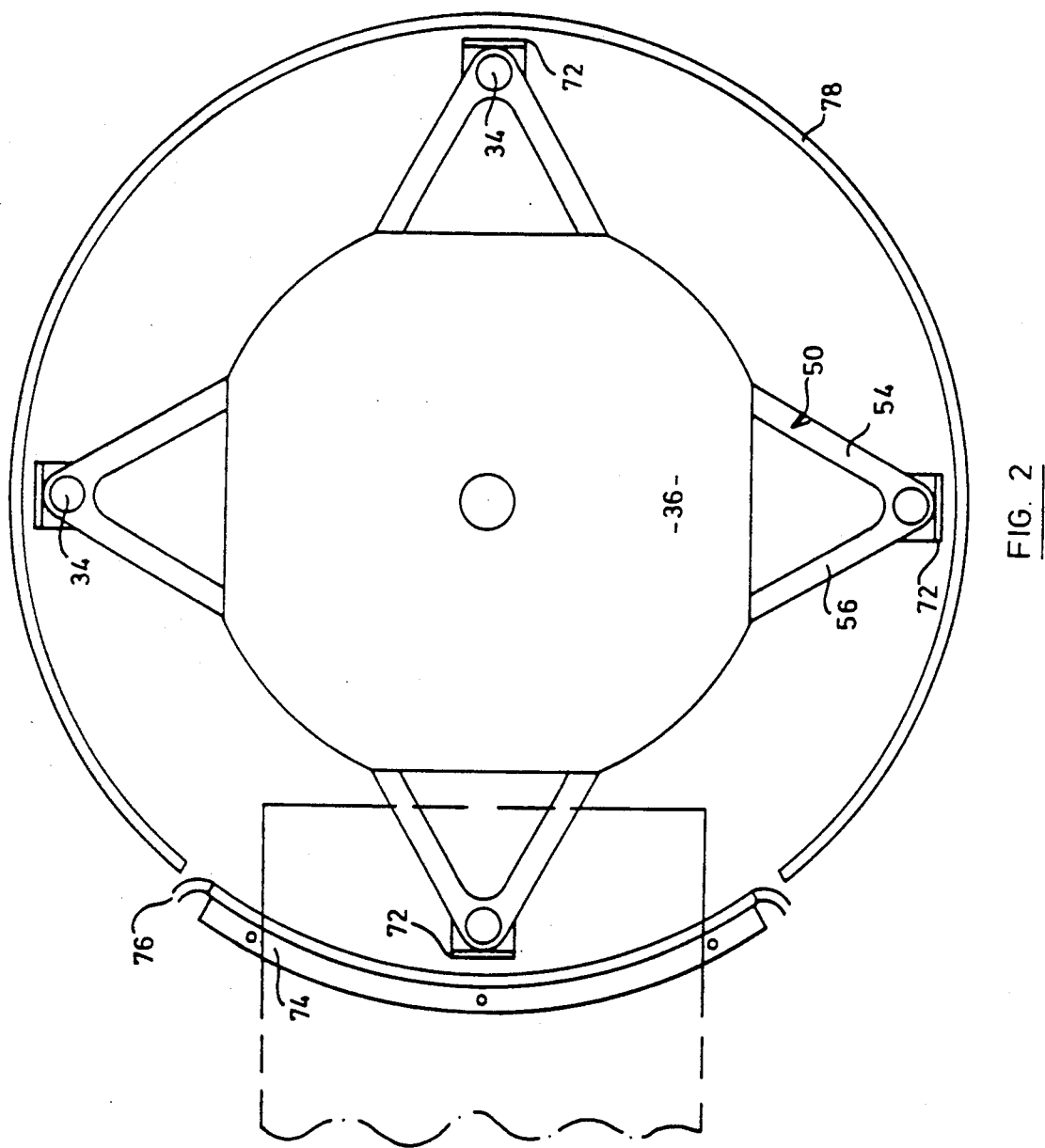
FIG. 2 is a plan view of the scanner shown in FIG. 1.
Figure 3:
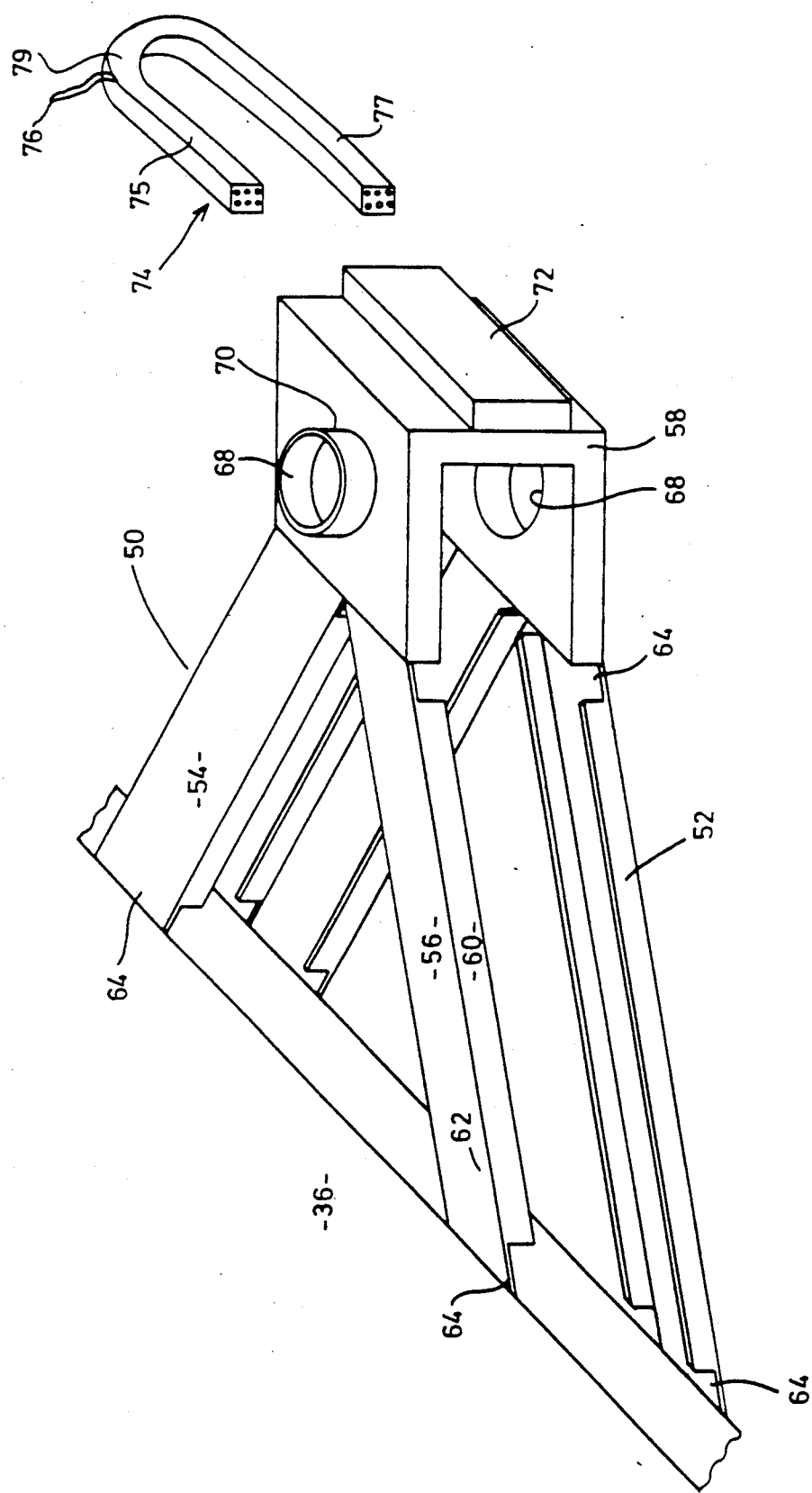
FIG. 3 is a perspective view of an alternative embodiment of the components shown in FIGS. 1 and 2.

Referring to FIGS. 1 and 2, an optical scanner 10 comprises a housing 12, a scanner assembly 14 and a distributor assembly 16. A card transport mechanism 18 is located in the housing 12 and moves a data card 20 incrementally through a motor 22.

The card 20 is scanned by an optical beam 24 generated by a laser diode 26. The beam 24 is radially displaced by the distributor assembly 16 that comprises four mirror pairs 28 secured to a central hub 29 and rotatable about an axis 30. The beam 24 is directed onto the mirror pairs 28 by a galvanometer mirror 31 along an axis 32 displaced from the axis 30. A beam splitter 33 is located between the diode 26 and mirror 31 and directs a return beam onto a photo detector 35.

Each of the mirror pairs 28 directs the optical beam 24 onto a respective one of four lenses 34 carried by the scanner assembly 14. The scanner assembly 14 includes a central hub 36 supported on bearing 38 for rotation about the axis 32. Rotor pole pieces 40 are attached to the peripheral wall 42 of a cavity 44 formed in the hub 36 and cooperate with a core winding 46 secured to the housing 12 to rotate the scanner assembly 14. A synchronous drive is provided to the distributor assembly 16 to ensure it rotates at the same rate as scanner assembly 14 so that the lens 34 is illuminated by the beam 24 as it passes over the card 20. The relationship between the distributor assembly 16 and scanner assembly 14 is discussed more fully in our co-pending application Ser. No. 07/388,376 filed Aug. 2, 1989, the contents of which are incorporated by reference. As noted in the co-pending application, the displacement of the axes of rotation of the distributor assembly 16 and scanner assembly 14 and the use of the mirror pairs 28 permits the optical beam 24 to remain on the axis of the lens 34 as it scans the card 20.

Each of the lenses 34 is supported on a mounting member 58 comprising a pair of bifurcated suspension elements 50,52 each of which has a pair of arms 54,56 that diverge in a direction toward the hub 36. The radially inner ends of arms 54,56 are secured to the hub 36 and are maintained in spaced relationship at their outer end by a strut 58. Each of the arms 54,56 are of channel cross section with flanges 60 extending along the lateral edges of a web 62. The flanges 60 terminate adjacent the inner and outer ends of the arms 54,56 to provide a pair of living hinges indicated at 64 on each arm. The hinges provide flexibility for the mounting members 50,52 in a direction parallel to the axis of rotation 32. Aligned apertures 66,68 are formed at the apex of the suspension elements 50,52 respectively to permit passage of the optical beam 24 and the lens 34 is secured within a cylindrical boss 70 to the upper elements 50 in alignment with the aperture 66.

To control movement of the lens 34 in the direction of the axis of rotation, a permanent magnet 72 is secured to the outer surface of strut 58. An electrical coil 74 is secured to the housing 10 by an L-shaped bracket 73 and extends along the path of the lens 34 as it passes over the card 20. The coil 74 has upper and lower runs 75,77 respectively interconnected by end turns 79 with the upper and lower runs oriented in the direction of the path of the lens 34, i.e. in a plane normal to the axis of rotation. Current is supplied to the coil 74 by leads 76 from a suitable controlled supply (not shown). The coil 74 is wound to induce a magnetic field which co-operates with the field established through the permanent magnet 72 so that changes in the current in the coil 74 induces movement of the magnet 72 in a direction parallel to the axis of rotation.

A magnetic strap 78 extends around the periphery of the assembly 14 between the coil ends to provide control of the suspension arms 50,52 after they have passed over the card 20 and a position sensor 80 is located at the start of the coil 74 to signal the start of a pass by a lens 34.

In operation, the scanner assembly 14 and distributor assembly 16 rotate in unison so that successive lenses 34 are illuminated as they scan the card 20. The card transport 18 increments the card 20 between successive passes of the lenses 34 so that each pass records or reads a separate track on the card 20. A focus error signal is generated by the optical pickup 35 in known manner and modulates the current supplied to the coil 74. The fields induced by the coil causes movement of the magnet 72 and the flexibility of the arms 54,56 allows movement of the lens 34 in a direction normal to the card to adjust the focal point of the lens 34 in the card 20. The centrifugal forces acting on the lens 34 by virtue of rotation of the scanner assembly 14 provides a restoring force to oppose movement of the magnet 72 and allow control of the position of the lens.

The position sensor 80 indicates the start of the next scan by the next lens and appropriate control signals for the coil can be generated. In this manner, the individual characteristics of each lens may be accomodated. The living hinges 64 provide the necessary flexibility to allow movement of the lens 34 under the influence of the coil 74 without undue power requirements. It will also be noted that the control of focus is obtained through stationary components, thereby avoiding transmission of control signals to the rotating distributor.

The bifurcated configuration of the suspension arms 50,52 is beneficial as it allows the flexibility in the desired direction but provides circumferential stiffness necessary to obtain the desired resolution.

It will be appreciated that the strut 58 is made from a non-magnetic material, i.e. aluminum, and that the vertical limb of bracket is preferably made from a magnetic material to maximize the flux density crossing the coil 74.

Figure 4:
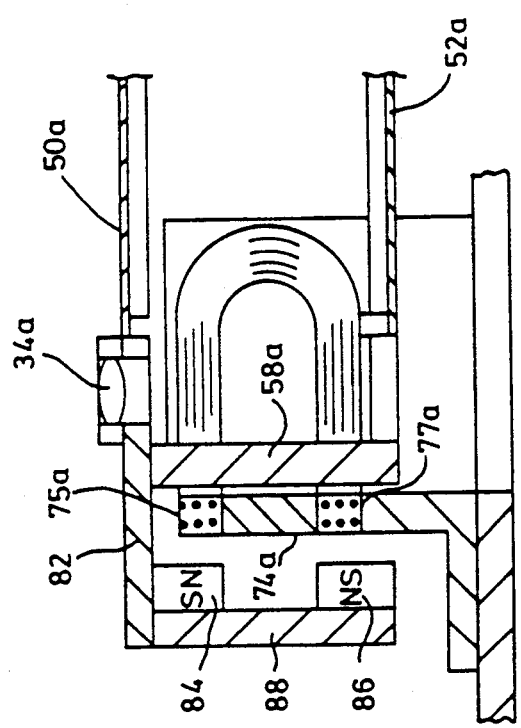
FIG. 4 is a sectional view of an alternative embodiment of the components shown in FIG. 1.

An alternative embodiment of scanner is shown in FIG. 4 where like components are identified by like reference numerals with a suffix "a" added for clarity. In the embodiment of FIG. 4, the strut 58a has a non-magnetic flange 82 that projects radially. A pair of permanent magnets 84,86 is mounted on a depending iron backing 88 and a similar iron web 89 is mounted on the strut 58a spaced from the magnets 84,86. The magnets 84,86 and webs 88,89 form a flux path and the coil 74a is located within the slot formed between the magnets and backing 88 to intersect the flux path.

The coil 74,74a may be a conventional wire wound coil or foil wound coil or may be a printed circuit coil if preferred.

Figure 5:
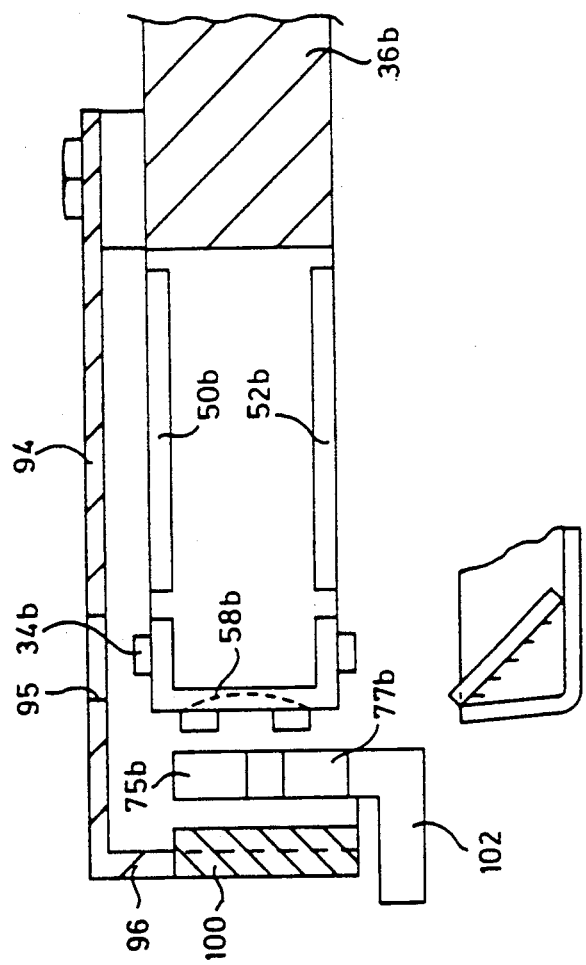
FIG. 5 is a view similar to FIG. 1 of a portion of an alternative embodiment of scanner.
Figure 6:
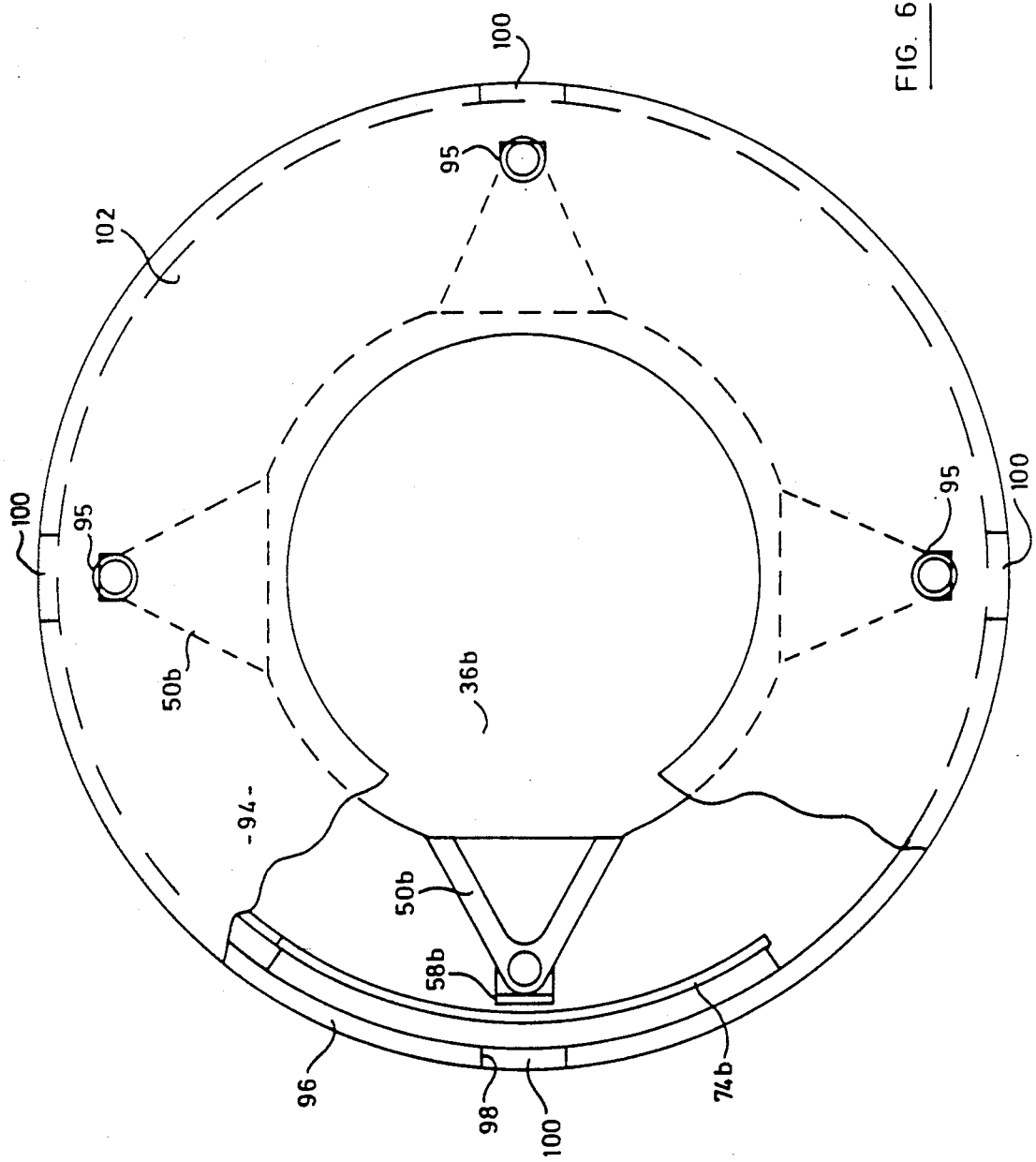
FIG. 6 is a view similar to FIG. 2 of the alternative embodiment shown in FIG. 5.
Figure 7:
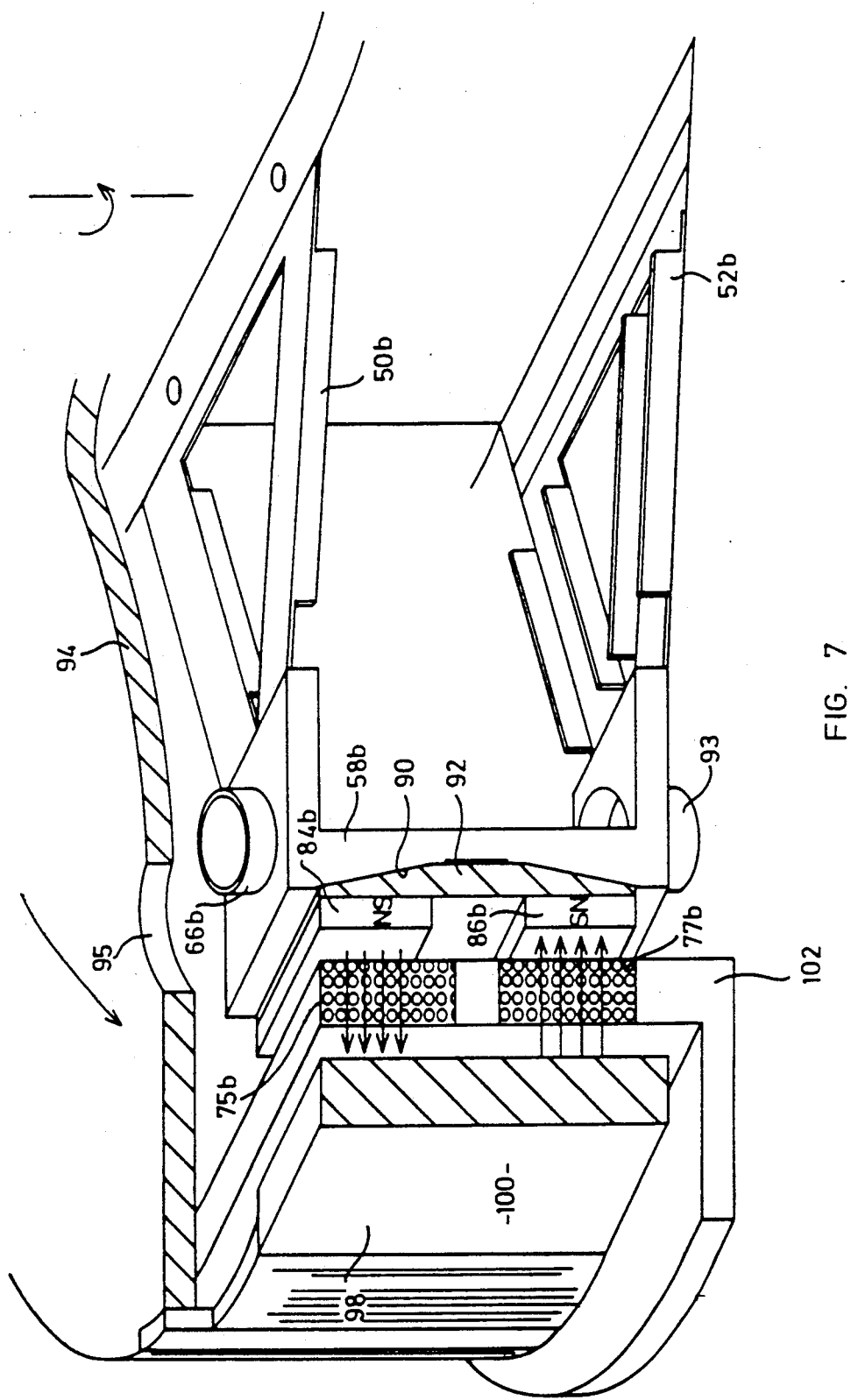
FIG. 7 is a perspective view partly in section of a portion of the scanner shown in FIG. 5.

A further embodiment is shown in FIGS. 5, 6 and 7 and like components will be identified by like reference numerals with a suffix 'b' added for clarity.

In the embodiment of FIGS. 5 to 7, the strut 58b is formed from a non-magnetic material such as aluminum and has a recess 90 formed on its radially outer face. An iron insert 92 of trapezoidal cross-section is located in the recess 90 and has a pair of permanent magnets 84b,86b disposed at the upper and lower ends of the insert 92. Strut 58b includes a boss 93 opposite the lens mount 66b to maintain the centre of mass of the mounting member equidistant between the suspension arms 50b,52b.

The hub 36b is formed with a radially extending disc 94 that projects radially beyond the suspension arms 50b,52b. The disc 94 has apertures 95 aligned with the lens 34b to allow the optical beam to pass to the card 20b. A skirt 96 of non-magnetic material depends from the periphery of the disc 94 and is interrupted at four locations to provide slots 98. Rectangular inserts 100 of magnetic material are located in the slots 98 and are radially aligned with the magnets 84b,86b. The radially inner face of inserts 100 is spaced from the radially outer face of magnets 84b,86b to receive a ring 102 secured to the housing 10b. A coil 74b is supported by the ring 102 and has upper and lower runs 75b,77b interconnected by end turns 79b. The upper and lower runs 75b,77b are aligned with the magnets 84b,86b and extend circumferentially over the extent of the card 80b.

In operation, the scanner assembly 14b is rotated about the axis 32b causing the lenses 34b to pass successively across the card 20b. Disc 94 rotates with hub 36b so that the inserts 100 rotate in unison with the mounting members 50b,52b. A magnetic flux loop is established through the magnets 84b, insert 100, magnet 86b and back iron 92b that intersects the coil 74b. By varying the current in the coil 74b flexure of suspension arms 50b,52b and thus the axial position of the lens 34b may be adjusted to maintain focus on the card 20b.

The arrangement of this embodiment is advantageous in that it reduces the inertia of the mounting member by axially fixing the inserts 100 on the disc 94. The skirt inserts 100 have a slightly greater axial height than the spacing between the magnets 84b,86b so that the flux loop is maintained over the maximum excursion of the mounting member. This in turn produces a radial force on the strut 58b to provide a restoring couple when the members are displaced to either side of the neutral position.

Moreover, the flux loop maintains the radial force over the entire rotation of the scanner assembly and avoids the eddy currents that result from the use of the magnetic strap in the embodiment of FIG. 1.

The trapezoidal cross section for the back iron 92 further contributes to a decrease in the supported mass and is chosen to maintain the flux density substantially uniform. The reduction in mass and the constant radial magnetic force provides an increased flexure stiffness for the arms 50b,52b to increase the resonance frequency of the structure.

It will be seen that in each embodiment, however, the scanner is provided with an axially moveable optical element that may be adjusted by the stationary drive element.

I claim:

1. An optical scanner having a stationary housing, a scanner assembly continuously rotatable in said housing about an axis of rotation and having a plurality of mounting members uniformly distributed about the axis of rotation and each carrying an optical element at a location spaced from the rotational axis of said assembly to cause each said optical element to move in a circular path relative to the housing and pass periodically across and scan a record, each of said mounting members being flexible to permit movement of the respective optical element in a direction parallel to the axis of rotation, and electromagnetic drive means including a coil secured to said stationary housing and, when energized, to produce an electromagnetic field in said coil by regulating current flowing through said coil, said electromagnetic field operable upon respective ones of said mounting members to control flexure of said respective ones of said mounting members as the optical element associated therewith passes over said record to thereby focus a light beam on said record.

2. A scanner is claimed in claim 1 where each of said mounting members is bifurcated to provide a pair of radially extending arms, said element being located at the bight of said bifurcation.

3. A scanner according to claim 2 wherein flexure of said arms is provided by a pair of hinges formed on each of said arms.

4. A scanner according to claim 1 wherein said coil extends along the path followed by said optical element to effect scanning and each of said mounting members carries a magnetic element, variation in the field induced by said coil thereby varying the flexure of said mounting member as the optical element associated therewith passes across said record.

5. A scanner according to claim 4 wherein said coil is arcuate and displaced radially from said scanner assembly.

6. A scanner according to claim 5 wherein said coil assembly extends over less than 360°.

7. A scanner according to claim 6 wherein locating means are provided to control flexure of each of said arms as said mounting members pass through the portion of said path over which said coil does not extend.

8. A scanner according to claim 4 wherein said drive means includes a pair of magnetic elements associated with each optical element and spaced on either side of said coil which, in operation, carry a magnetic flux therethrough.

9. A scanner according to claim 8 wherein each of said magnetic elements is carried by a respective mounting member.

10. A scanner according to claim 8 wherein one of said elements is carried by said mounting member and the other of said elements is rigidly secured to said scanner assembly, said one element thereby moving independently of said other in a direction parallel to said rotational axis.

11. A scanner according to claim 10 wherein each of said mounting members is secured to a central hub and said other element is secured to a radial extension of said hub.

12. A scanner according to claim 11 wherein said other element depends from said radial extension.

13. A scanner according to claim 10 wherein said one element is a permanent magnet and said other element is a magnetic material.

14. A scanner according to claim 13 wherein said other element is configured to provide a substantially uniform flux density therethrough.

15. A scanner according to claim 14 wherein said other element has a trapezoidal cross section.

16. A scanner according to claim 11 wherein each of said mounting members are secured to a central hub and said other element is secured to a radial extension of said hub.

17. A scanner according to claim 16 wherein said other element depends from said radial extension.

18. A scanner according to claim 17 wherein said radial extension is a disc having a peripheral skirt depending therefrom and said other element is secured to said skirt.

19. A scanner according to claim 18 wherein said coil is mounted on a ring disposed between said elements, said coil extending partially along said ring.

20. A scanner according to claim 19 wherein said other elements secured to said skirt in radial alignment with respective ones of said one elements.

21. A scanner according to claim 20 wherein each of said mounting members comprises a pair of arms spaced apart along said axis of rotation.

22. A scanner according to claim 21 wherein each of said arms is bifurcated to provide a pair of circumferentially spaced connections for each arm on said hub.

23. A scanner according to claim 22 wherein respective ones of said one elements extend between the radially outer portions of the arms of the mounting member.

24. A scanner according to claim 22 wherein each of said arms includes a pair of radially spaced hinges to facilitate flexure of said arm.

25. A scanner according to claim 1 wherein said locating means includes a stationary magnetic element cooperating with said magnetic elements on said mounting members.

26. A scanner according to claim 1 including a light source fixed to said housing and light distribution means to cause said beam to impinge upon said optical elements as they pass across said record.

27. A scanner accounting to claim 26 wherein said mounting means is disposed in the optical path between said light distribution means and said record.

28. A scanner according to claim 26 wherein said light distribution means is rotatable about an axis and includes beam deflection means to displace radially said beam.

29. A scanner according to claim 28 wherein said beam deflection means deflects said beam from the axis of rotation of said scanner assembly to the radius of said optical elements.

30. A scanner according to claim 29 wherein said beam deflection means causes said beam to impinge said optical elements along the optical axis thereof, said drive means moving said optical elements along said optical axis toward and away from said distribution means.

31. A scanner assembly according to claim 29 wherein said distribution means rotates about an axis spaced from said axis of rotation of said scanner assembly.

* * * * *